United States Patent [19]

Ben-Porat

[11] 4,430,907

[45] Feb. 14, 1984

[54] THROTTLE CONTROL LINKAGE WITH NON-LINEAR OUTPUT

[75] Inventor: Avi Ben-Porat, Norwalk, Conn.

[73] Assignee: Avco Corporation, Stratford, Conn.

[21] Appl. No.: 211,238

[22] Filed: Nov. 28, 1980

[51] Int. Cl.³ .............................................. G05G 1/04
[52] U.S. Cl. ..................................................... 74/516
[58] Field of Search .......................... 74/516, 491, 518

[56] References Cited

U.S. PATENT DOCUMENTS 2,037,868 4/1936 Wall ...................................... 74/516
2,464,097 3/1949 Orscheln ............................... 74/518

OTHER PUBLICATIONS

A.P.C. Application of Henke, Ser. No. 304,651, published May 4, 1943.

Primary Examiner—Kenneth Dorner
Attorney, Agent, or Firm—Ralph D. Gelling

[57] ABSTRACT

A linkage system is disclosed adapted to be connected between a pilot's input lever and an engine power output lever. The linkage system is operative to vary the displacement ratio characteristics between the input and output levers. More specifically, during the first portion of input lever stroke, wherein shaft horsepower is raised from a ground idle speed to flight speed, the output lever is displaced an amount greater than the amount the input lever is displaced. In contrast, during the second portion of the stroke, corresponding to the upper range of shaft horsepower used in flight, a fixed amount of displacement of the input lever results in a smaller displacement of the output lever. By this arrangement, the control of the aircraft in flight is facilitated.

10 Claims, 6 Drawing Figures

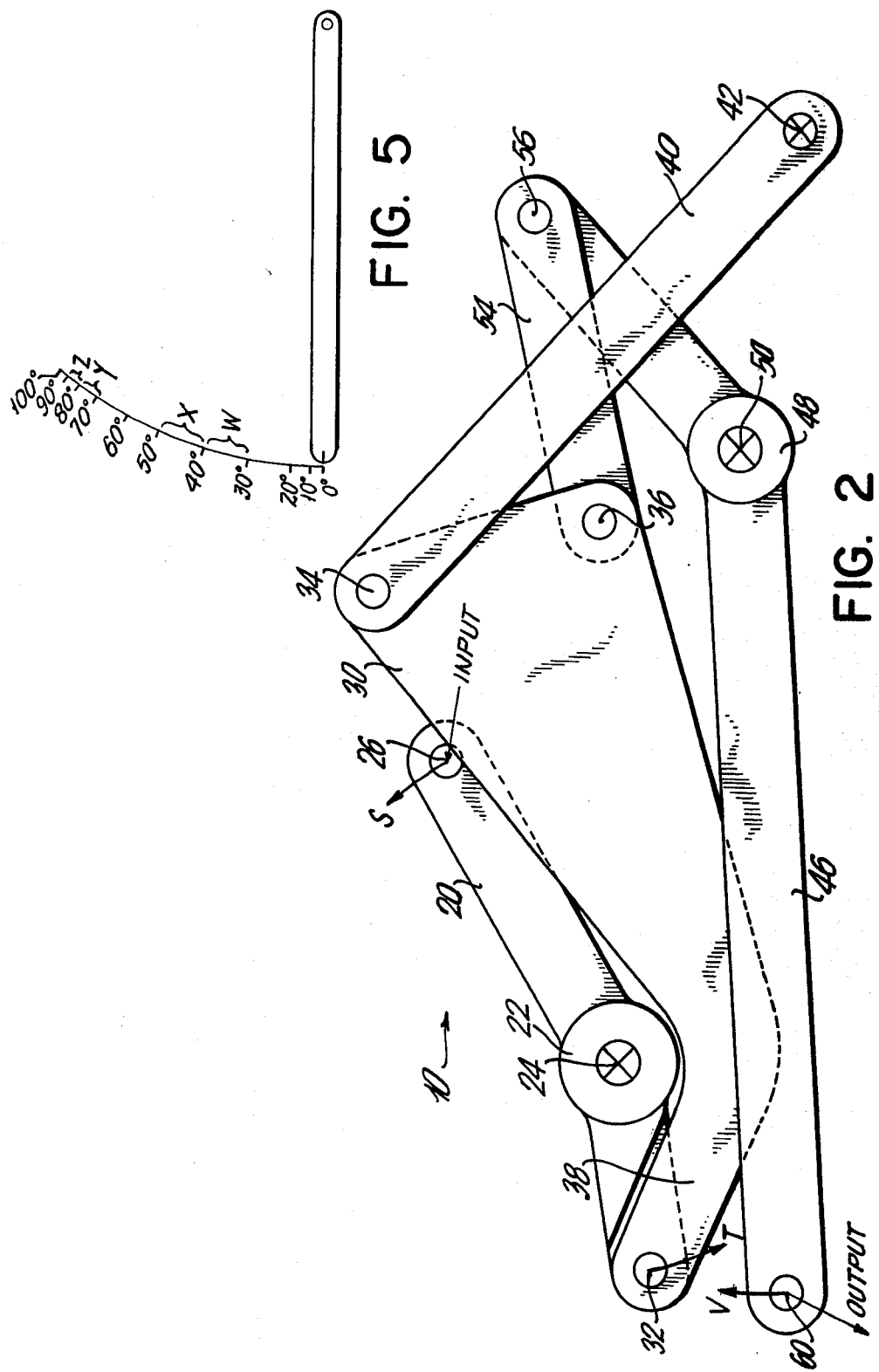

THROTTLE CONTROL LINKAGE WITH NON-LINEAR OUTPUT

TECHNICAL FIELD

The subject invention relates to a unique linkage system adapted to be connected between a pilot's input lever and an engine power output lever for varying the displacement ratio characteristics therebetween throughout the stroke of the input lever.

BACKGROUND OF INVENTION

Fuel control systems for aircraft are generally of a mechanical type wherein fuel flow is regulated by a direct linkage between the pilot's power input lever and the output lever connected to the aircraft engine. The direct linkage results in a 1:1 displacement ratio between the input and output levers. Thus, for every degree of movement of the pilot's input lever, a corresponding and equal displacement of the output lever will be achieved through a linear linkage.

In a typical fuel control system for an aircraft, the initial portion of the stroke of the levers brings the engine from full reverse horsepower to a ground idle condition. The second portion of the stroke raises the engine horsepower from the ground idle mode to minimum flight horsepower. The remaining portion of the stroke is used to control engine horsepower in flight. In normal operating procedures a pilot uses full reverse horsepower for landing and a small range of ground idle speeds for taxiing. These maneuvers require relatively few adjustments of the input lever. In contrast, during flight, a wide range of speeds and therefore shaft horsepower are utilized. With the prior art linear linkage system, power management in flight is confined to the last third of the stroke of the input lever. Since small movements of the pilot's input lever result in significant changes in the engine horsepower, fuel and power management in flight is difficult.

Various means have been suggested for modifying the displacement ratio between the input and output levers, in order to achieve greater sensitivity in flight. More specifically, it would be desirable to provide a means which varies the displacement ratios of the levers throughout the input stroke such that during the first portion of the stroke, wherein the engine horsepower is raised to flight speed, a given displacement of the input lever results in a greater amount of displacement of the output lever. In contrast, in the latter portion of the input stroke, for controlling shaft horsepower in flight, a given displacement of the input lever results in a smaller amount of displacement of the output lever. By this arrangement, small variations in shaft horsepower in flight could be readily achieved by the pilot.

Various mechanical or electromechanical equipment may be designed to accomplish the above stated objective. For example, the throttle control can be electronically or hydraulically activated or a gear system could be utilized. However, besides the high cost of the latter expedients, a major shortcoming associated therewith is their relative unreliability as compared with a linkage mechanism. Even a relatively simple gearing system is considered to be a hundred times less reliable than a linkage system. Similarly, hydraulic and electronic systems which are inherently far more complex, are even less reliable. As can be appreciated, high reliability is of premium concern when dealing with the power control of an engine in an aircraft.

Accordingly, it is an object of the subject invention to provide a new and improved linkage system having high reliability which is operative to vary the displacement ratio characteristics between input and output levers.

It is another object of the subject invention to provide a unique linkage system arranged such that the amount of displacement of the output lever during the first portion of the stroke is greater than the displacement of the input lever.

It is a further object of the subject invention to provide a unique linkage system arranged such that during the second portion of the input stroke, used for controlling flight, the displacement of the output lever is less than the displacement of the input lever thereby increasing the sensitivity of the input lever for improved in-flight engine power management.

It is still another object of the subject invention to provide a new and improved linkage system which functions to vary the displacement ratio characteristics of the input and output levers and in addition increases the mechanical advantage of the input lever during the latter portion of the input stroke to aid in the pilot's control.

SUMMARY OF THE INVENTION

In accordance with the above stated objects, the subject invention provides for a linkage system, adapted to be connected between a pilot's input lever and an engine power output lever, that is operative to vary the displacement ratio characteristics of the input and output levers. The linkage system includes a plurality of cranks and links some of which are pivotally mounted to a control box while others are free-floating. More specifically, the linkage system includes an angled input crank having an intermediate pivot point disposed at the apex of the angle of the crank. The pivot point is pivotally connected to a mounting means such as the control box. One end of the input crank is pivotally connected to the pilot's input lever, while the opposed end thereof is connected to a ternary link or bellcrank having three corner connecting points. The bellcrank is generally triangular in configuration and includes an angled extension which is connected to the input crank. As described more fully hereinbelow, the included angles formed by an imaginary triangle connecting the three corner connecting points of the bellcrank contribute to the unique displacement characteristics of the subject linkage system.

The linkage system further includes a linear fixed link having one end thereof connected to the mounting means and the other end connected to the second connecting point of the bellcrank. Since the latter linear link is fixed, the movement of the second connecting point of the bellcrank is limited to a circular path having a radius equal to the length of the fixed link.

An angled output crank is provided having an intermediate pivot point at the apex of the angle, which is pivotally connected to the mounting means. One end of the output crank is connected to the engine output lever while the opposed end of thereof is connected, via a linear floating coupler link, to the third connecting point of the bellcrank. The above described linkage system is operative to vary the displacement ratio characteristics between the pilot's input lever and the engine output lever. More specifically, the initial portion of the pilot's input lever stroke, wherein shaft horsepower is raised to flight speeds, the displacement of output lever is less than the displacement of the input lever, thereby effectively shrinking or shortening the portion of the stroke. Conversely, in the latter portion of the input stroke, corresponding to flight horsepower conditions, the displacement of the output lever is less than the displacement of the input lever, thereby expanding this portion of the stroke to provide increased sensitivity for improved engine power management. The subject linkage system is highly reliable and in addition provides a mechanical advantage during the second portion of the stroke.

Further objects and advantages of the subject invention will become apparent from the following detailed description taken in conjunction with the drawings in which:

BRIEF DESCRIPTION OF THE DRAWINGS

FIG. 2 is a schematic illustration of the new and improved linkage system of the subject invention showing the arrangement of the components at the beginning of a stroke.

FIG. 5 is a graphical representation of the output crank of the linkage system of the subject invention showing its specific positions based on the movement of the pilot's input lever.

DESCRIPTION OF THE PREFERRED EMBODIMENT

Figure 1:
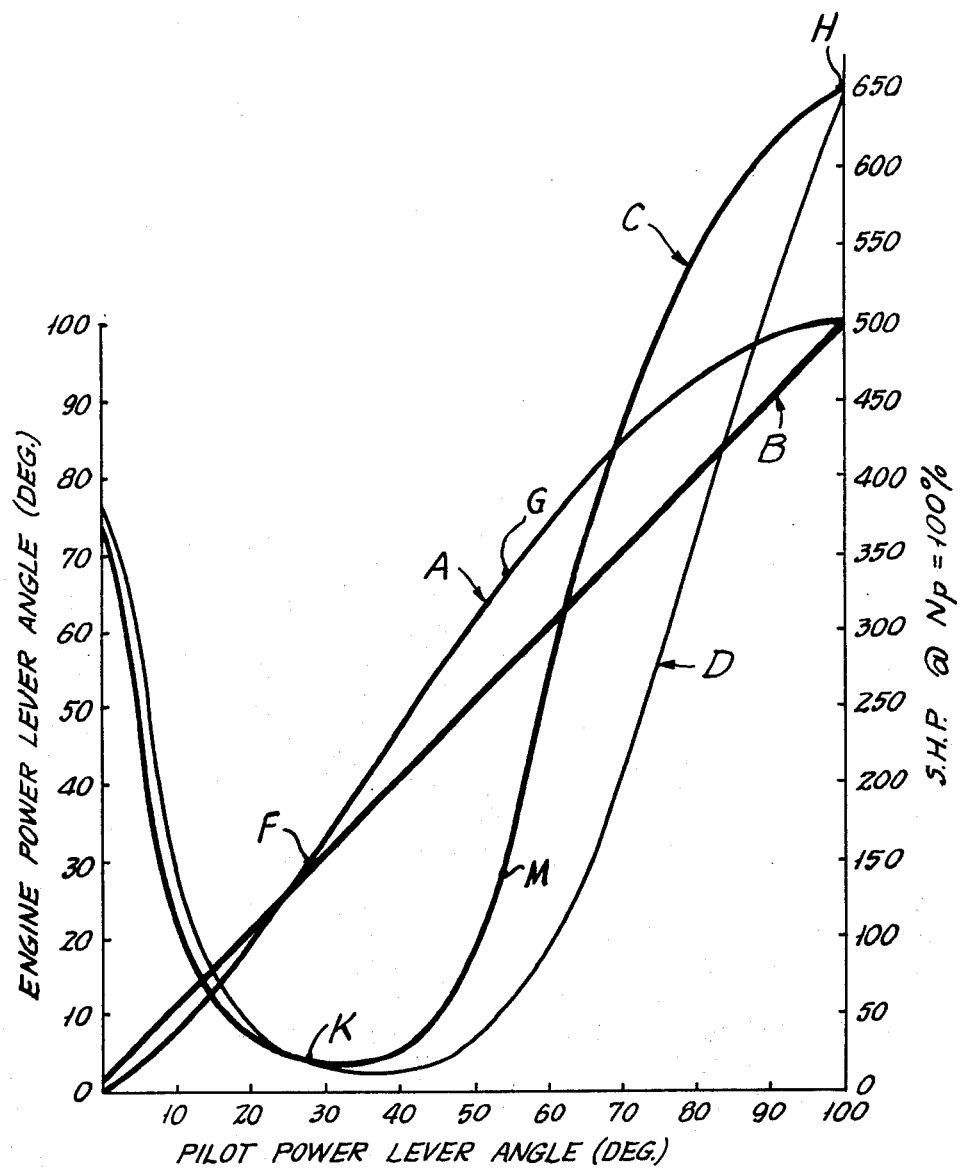
FIG. 1 is a graph illustrating the movement of both the prior art straight linkage system and the subject linkage system and more particularly illustrates the movement of the pilot's input power lever as compared with both the engine output power lever and the shaft horsepower generated by an engine.

Referring to FIG. 1, there is illustrated a graph depicting the displacement characteristics of the input and output levers and their relationship to the shaft horsepower of typical engine. Lines A and B relate the pilot's input lever angle to the engine power output lever angle, as shown on the vertical scale on the left hand side of the graph. Lines C and D relate the pilot's input lever angle to the shaft horsepower of an engine as shown on the vertical scale on the right hand side of the graph.

Referring specifically to line B, there is illustrated the correlation between the pilot's input lever angle measured in degrees and the resulting engine power output lever angle associated with the prior art straight linkage system. As is apparent, line B is straight, indicating that every degree of displacement of the pilot's input lever produces a corresponding degree displacement of the engine power lever. Line D illustrates the shaft horsepower which is produced by a typical engine when it is connected to a pilot's input lever through the prior art straight linkage. At zero degrees, the engine is turning out between 350 and 400 shaft horsepower in reverse. As the pilot's input lever is moved into the 35 to 37 degree range, the engine is producing less than 50 shaft horsepower corresponding to the ground idle position. As the pilot's input lever is shifted to 100°, line D curves parabolically upwardly until shaft horsepower is equal to 650. While maximum shaft horsepower is used primarily at take-off, the aircraft is generally flown with the engine generating between 150-650 shaft horsepower. As illustrated in FIG. 1, this range corresponds to the 65 to 100 degree range of the pilot's input lever angle. Thus, engine power management during flight by the pilot is restricted to approximately ⅓ of the final portion of the stroke of the power lever.

As noted above, it would be desirable to expand this portion of the pilot's lever stroke in order to provide more sensitivity in flight. More specifically, it is desirable to provide a highly reliable means for increasing the sensitivity of the second portion of the stroke while decreasing the sensitivity of the first portion of the stroke.

The foregoing objects are achieved through applicant's new and improved linkage system. The displacement ratio characteristics of the subject invention are illustrated in FIG. 1, lines A and C. Referring to line A, it is seen that while the initial portion of the stroke is similar to the prior art linkage, the entire forward horsepower portion of the stroke is substantially different. More particularly, the portion of line A between points F and G has a relatively steep slope indicating that any given displacement of the input lever produces a greater displacement of the output lever. Conversely, in the portion of the stroke between points G and H, the slope is less than the 1:1 ratio of line B and indicates that any given displacement of the input lever will result in a smaller displacement of the power output lever.

The effect of this arrangement can be better appreciated by referring to line C. More specifically, while the reverse horsepower section of the curve is relatively the same as the prior art, it is noted that the minimum ground idle shaft horsepower (between 0 and 50) falls at point K corresponding to an input lever angle of approximately 28 degrees which is about 5 to 7 degrees before the prior art straight linkage. Thereafter, as the pilot's input lever angle is increased, shaft horsepower rapidly increases such that the minimum flight horsepower, between 100 and 150 and represented at point M, corresponds to an input lever angle of between 53 and 54 degrees. Thus, the usable portion of the pilot's lever angle in flight which, as noted above, corresponds to shaft horsepower between 150 and 650, is expanded from 35 degrees (100 degrees minus 65 degrees) to 46 degrees (100 degrees minus 54 degrees). Stated differently, the usable power stroke is expanded by one third from that found in the prior art resulting in a substantial increase in sensitivity. In addition, and as discussed more fully hereinbelow, the subject linkage system also increases the mechanical efficiency of the pilot's input lever to further facilitate engine power management.

Figure 2A:
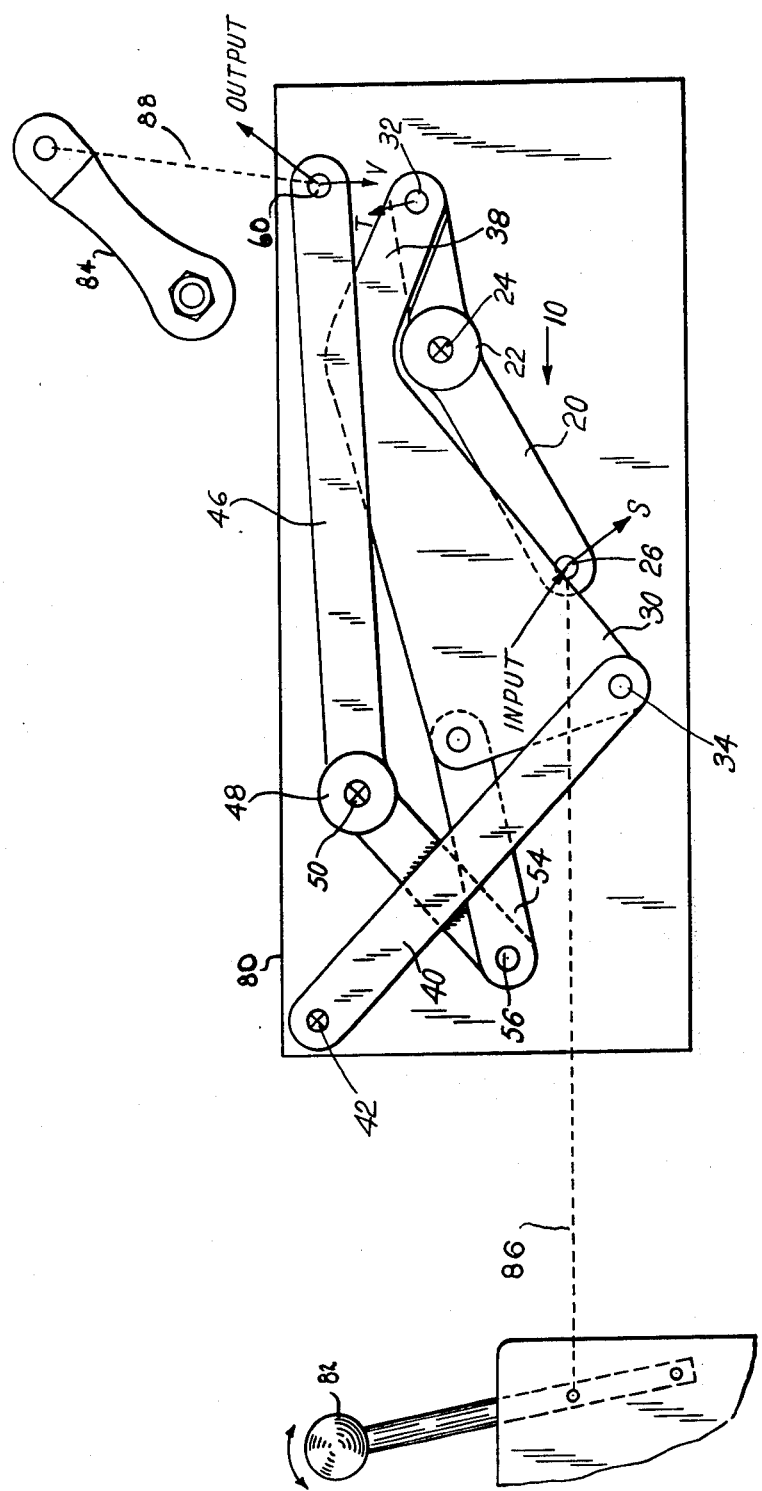
FIG. 2A is a schematic illustration of the new and improved linkage system of the subject invention showing the arrangement of the components at the beginning of a stroke as shown in FIG. 2 and further including the pilot's input lever and the engine output power lever.

Referring now to FIG. 2, the preferred embodiment of the subject linkage system 10 is illustrated and includes an angled input crank 20 having an intermediate pivot point 22 which is pivotally connected to a mounting means such as a control box 80 at 24. The input crank 20 is connected to the pilot's input lever 82 by linkage means 86 at point 26 via a pin joint.

The subject linkage system further includes a ternary link 30 having first, second and third corner connecting points 32, 34 and 36 respectively. Ternary link 30 is preferably a bellcrank having an angled extension portion 38 which is pivotally connected to the other end of the input crank 20 at connecting point 32. A linear fixed link 40 is provided having one end thereof pivotally connected to the mounting means at point 42. The opposed end of the fixed link 40 is pivotally connected to the second corner connecting point 34 of bellcrank 30.

An angled output crank 46 is provided having an intermediate pivot point 48 which is pivotally connected to the mounting means at point 50. The output crank 46 is connected to the bellcrank 30 via a floating linear coupler link 54. More particularly, one end of coupler link 54 is pivotally connected to output crank 46 at point 56 while the other end thereof is connected to the third corner connecting point 36 of bellcrank 30. The free end of output crank 46 is connected to the engine power output lever 84 by linkage means 86 at point 60.

The desired displacement ratio characteristics of the linkage system as illustrated in lines A and C in FIG. 1, are in part achieved by the relative orientation of the corner connecting points 32, 34, and 36 of bellcrank 30. An imaginary triangle, shown in phantom in FIG. 3, has been drawn connecting corner points 32, 34 and 36 to more clearly illustrate this relationship. Preferably, the included angle N, associated with the first corner connecting point 32, falls within a range between 18 and 20 degrees. The included angle P associated with second connecting point 34 is preferably between 82 and 84 degrees, while the included angle R, associated with third connecting point 36 is preferably between 76 and 78 degrees. Angled extension portion 38 of bellcrank 30 is disposed at an angle of 139° relative to side 70 of the bellcrank. The angled extension portion 38 is provided to facilitate the movement of the linkage system.

Figure 3:
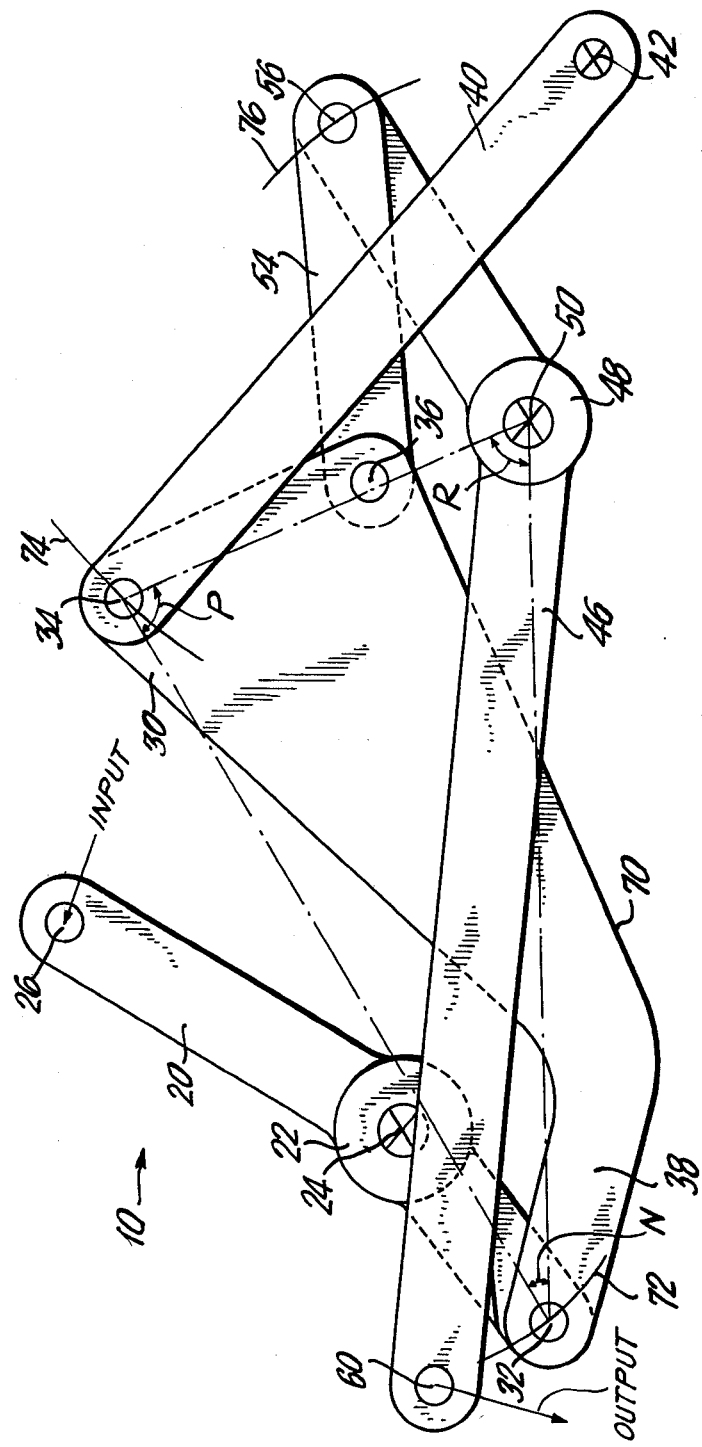
FIG. 3 is a schematic view of the new and improved linkage system of the subject invention showing the arrangement of the components at an intermediate point in the stroke.

Another important factor in controlling the overall motion of the linkage system of the subject invention concerns the limiting effects of the pivotal connections between points 24, 42, and 50 of the mounting means (not shown). More specifically, and as illustrated in FIG. 3, since connecting point 24 is affixed to a mounting means, corner connecting point 32 is constrained to move along a path illustrated by line 72 and corresponding to a circle having a radius equal to the distance between connecting points 24 and 32. Similarly, corner connecting point 34 is constrained to move along a path illustrated by line 74 corresponding to a circle having a radius equal to the length of fixed link 40. Further, connecting point 56 is constrained to move along line 76 corresponding to a circle having a radius equal to the distance between connecting points 50 and 56. Thus, the location of the connecting points 24, 42 and 50, as well as the length of the associated links contributes to the unique varying displacement ratio characteristics of the subject invention.

Figure 4:
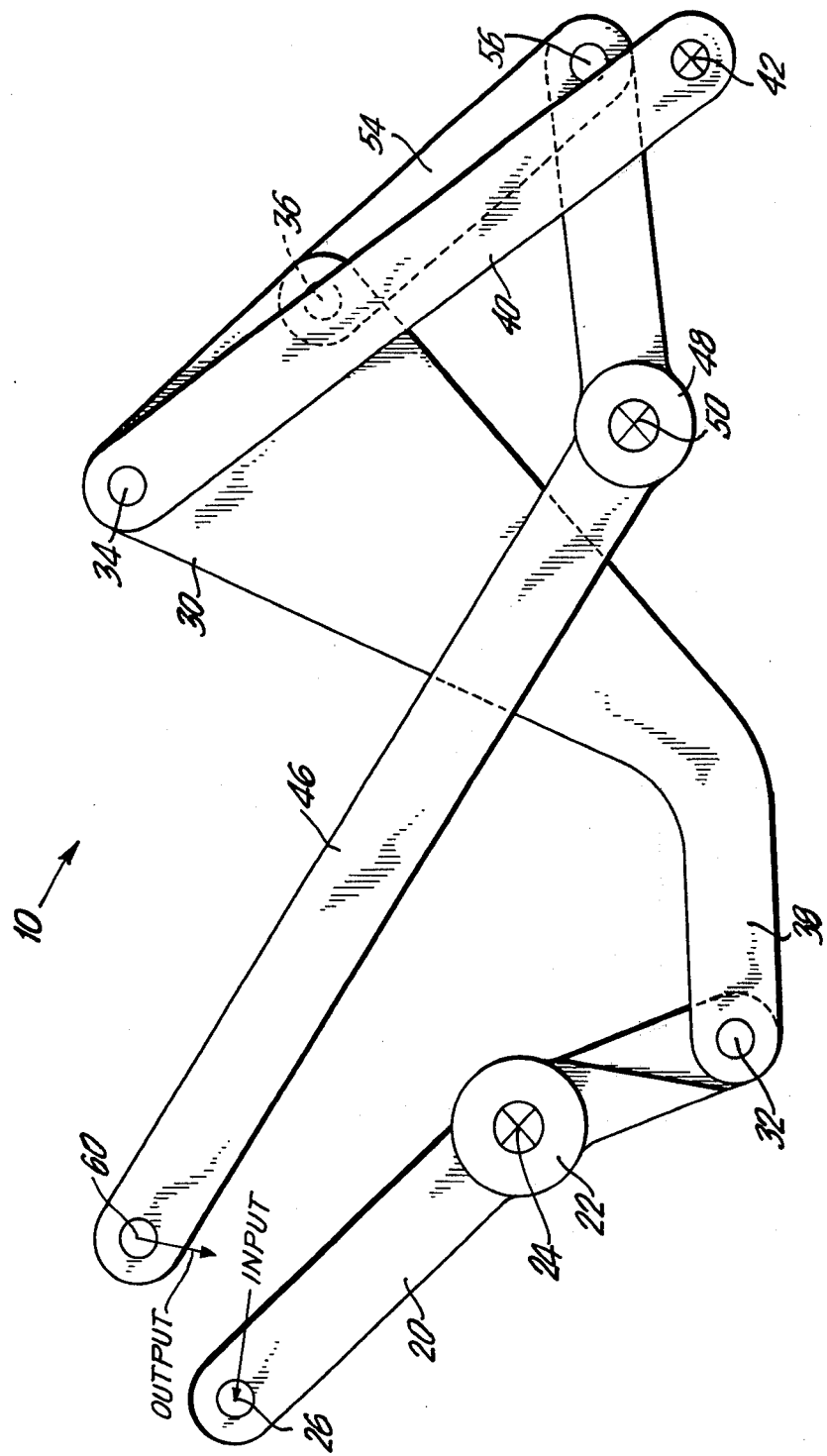
FIG. 4 is a schematic view of the new and improved linkage system of the subject invention illustrating the location of the components at the end of the stroke.

Referring now to the sequence of FIGS. 2 through 4, the subject linkage system is shown being advanced through the full stroke of the input crank 20. More specifically, as illustrated in FIG. 2, the subject linkage system is illustrated at the start of the stroke with input crank 20 located at zero degrees. As input crank 20 is rotated about pivot point 24 in a direction indicated by arrow S in FIG. 2, the extension portion 38 of bellcrank 30 is urged downwardly and to the right, as indicated by arrow T. As noted above, the movement of corner connecting point 34 of bellcrank 30 is constrained by fixed link 40, while the movement of corner connecting point 36 is transmitted to the output crank 46 via floating coupler link 54. The output end 60 of output crank 46 is caused to move in a direction indicated by arrow V about pivot point 50. As illustrated in FIG. 3, the input crank 20 has been rotated approximately 28° from the zero position of FIG. 2 while the output crank has moved in response approximately 30°. This relationship is illustrated on the graph in FIG. 1 at point F. Continued rotation of the input crank 20 through the full 100 degrees of the input stroke results in the arrangement as shown in FIG. 4.

The position of the end point 60 of the output crank 46 at both the beginning and the end of its stroke are intended to be identical to the positions achieved by the prior art linear linkage system, however, the intermediate positions are different throughout the stroke, as a result of the varying displacement ratios between the input and output cranks 20, 46. The change in displacement ratios can be more readily appreciated by referring to FIG. 5 wherein the degree numbers represent the position of the input crank 20 while the line numbers, adjacent each degree number represent the corresponding position of the output crank 46. More specifically, the intervals W and X, for example, which fall within the intermediate portion of the stroke, illustrate relatively large output crank displacements for a given movement of the input crank 20. In contrast, in the latter portion of the stroke, intervals Y and Z illustrate relatively small output crank displacements for the same given movement of the input crank 20. Thus, it is apparent that the displacement ratios between the input and output cranks vary over the length of the input stroke. By this arrangement and as noted above, the sensitivity in the latter portion of the stroke, corresponding to flight horsepower, is increased such that engine power management in flight is facilitated.

Another advantage of the subject linkage system is that an additional mechanical advantage is achieved thereby. In the prior art linear linkage system, any mechanical advantage is derived from the length of the pilot's lever arm. More particularly, the pilot's lever arm, which is generally an angled crank that is fixedly connected about a pivot point, will provide a mechanical advantage based on the length of the crank from the pivot point to its free end. The mechanical advantage gained by the pilot's lever facilitates the movement of engine output lever. However, since space considerations in a flight cabin limit the length of the pilot's lever, it would be desirable to provide an additional mechanical advantage to further facilitate engine power management during flight. The linkage system of the subject invention provides such a mechanical advantage. More particularly, an added mechanical advantage is achieved during the latter portion of the stroke and increases until the end of the stroke. With the preferred embodiment of the subject invention, the mechanical advantage is increased by a factor of five by the end of the stroke. Thus, the subject linkage system not only functions to vary the displacement ratios of the input and output levers, but in addition reduces the force necessary to move the system in its most crucial phase.

In summary, there is provided a new and improved linkage system adapted to be connected between a pilot's input lever 82 and an engine power output lever 84 for varying the displacement ratio characteristics of the levers. More particularly, the subject linkage system is operative to produce a larger output displacement for a given input displacement, in the first portion of the input stroke, corresponding to the reverse and idle phases of engine. In contrast, in the latter phase of the stroke of the input lever which corresponds to flight, however, a smaller output displacement is produced for a given input displacement. By this arrangement, increased sensitivity is achieved in the latter phase of the input stroke thereby facilitating engine power management. Further, the subject linkage system creates an added mechanical advantage, particularly in the latter phase of the stroke, such that forces needed to move the system are reduced. In addition, the subject linkage system is highly reliable and relatively inexpensive to manufacture.

Although the subject linkage system has been described by reference to a preferred embodiment, it is apparent that other modifications could be devised by those skilled in the art that would fall within the scope and spirit of the present invention as defined by the appended claims.

What is claimed is:

1. A linkage system adapted to be connected between a pilot's input lever and a power output lever of an engine, said linkage system being operative to vary the displacement ratio characteristics between the input and output levers, with the amount of displacement of said output lever being greater than the displacement of the input lever during a first portion of the stroke of said input lever and with the amount of displacement of said output lever being less than the displacement of the input lever during a second portion of the stroke, said linkage system comprising:
   mounting means providing a support for said linkage system;
   an input crank having an intermediate pivot point, said pivot point being pivotally connected to said mounting means, and with one end of said input crank being connected to said pilot's input lever;
   a bellcrank of generally triangular configuration having first, second and third corner connecting points, with said first corner connecting point being pivotally connected to the opposed end of said input crank;
   a linear fixed link having one end thereof pivotally connected to said mounting means and with the opposed end of said fixed link being pivotally connected to said second corner connecting point of said bellcrank;
   a linear coupler link having one end thereof pivotally connected to said third corner connecting point of said bellcrank; and
   an output crank having an intermediate pivot point, said pivot point being pivotally connected to said mounting means, with one end of said output crank being pivotally connected to the opposed end of said coupler link and with the opposed end of said output crank being pivotally connected to said engine power output lever and wherein the angles defining said triangular bellcrank are arranged such that the displacement ratio between said input and output levers varies over the stroke of the input lever whereby a given displacement of the input lever during said first portion of its stroke results in a greater amount of displacement of the output lever, while the amount of displacement of the input lever during said second portion of the stroke results in smaller amount of displacement of the output lever such that greater sensitivity is obtained during said second portion of the stroke.

2. A linkage system as recited in claim 1 wherein the included angle associated with said first corner connecting point of said triangular bellcrank is in the range of 18 to 20 degrees.

3. A linkage system as recited in claim 1 wherein the included angle associated with said second corner connecting point of said triangular bellcrank is in the range of 82 to 84 degrees.

4. A linkage system as recited in claim 1 wherein the included angle associated with said first corner connecting point is in the range of 18 to 20 degrees and wherein the included angle associated with said second corner connecting point is in the range of 82 to 84 degrees.

5. A linkage system as recited in claim 1 wherein said triangular bellcrank further includes an angled extension portion, said angled extension portion including said first connecting point which is pivotally connected to said input crank.

6. A linkage system as recited in claim 1 wherein said input crank is angled with said intermediate pivot point being located at the apex of said angle.

7. A linkage system as recited in claim 1 wherein said output crank is angled with said intermediate pivot point being located at the apex of said angle.

8. A linkage system adapted to be connected between a pilot's input lever and a power output lever of an engine, said linkage system being operative to vary the displacement ratio characteristics between the input and output levers, with the amount of displacement of said output lever being greater than the displacement of the input lever during a first portion of the stroke of said input lever and with the amount of displacement of said output lever being less than the displacement of the input lever during a second portion of the stroke, said linkage system comprising:
   mounting means providing a support for said linkage system;
   an input crank having an intermediate pivot point, said pivot point being pivotally connected to said mounting means, and with one end of said input crank being connected to said pilot's input lever;
   a bellcrank of generally triangular configuration having first, second and third corner connecting points, with the included angle associated with said first corner connecting point being in the range of 18 to 20 degrees and with the included angle associated with said second corner connecting point being in the range of 82 to 84 degrees, said bellcrank further including an angled extension portion with said first corner connecting point being located thereon, with said first corner connecting point being pivotally connected to the opposed end of said input crank;
   a linear fixed link having one end thereof pivotally connected to said mounting means and with the opposed end of said fixed link being pivotally connected to said second corner connecting point of said bellcrank;
   a linear coupler link having one end thereof pivotally connected to said third corner connecting point of said bellcrank; and
   an output crank having an intermediate pivot point, said pivot point being pivotally connected to said mounting means, with one end of said output crank being pivotally connected to the opposed end of said coupler link and with the opposed end of said output crank being pivotally connected to said engine power output lever and wherein the angles defining said triangular bellcrank are arranged such that the displacement ratio between said input and output levers varies over the stroke of the input lever whereby a given displacement of the input lever during said first portion of its stroke results in a greater amount of displacement of the output lever, while the amount of displacement of the input lever during said second portion of the stroke results in smaller amount of displacement of the output lever such that greater sensitivity is obtained during said second portion of the stroke.

9. A linkage system as recited in claim 8 wherein said input crank is angled with said intermediate pivot point being located at the apex of said angle.

10. A linkage system as recited in claim 8 wherein said output crank is angled with said intermediate pivot point being located at the apex of said angle.

* * * * *